United States Patent
Mori

(10) Patent No.: US 8,718,903 B2
(45) Date of Patent: May 6, 2014

(54) DIRECT INJECTION SPARK IGNITION INTERNAL COMBUSTION ENGINE, AND FUEL INJECTION CONTROL METHOD THEREFOR

(75) Inventor: Sachio Mori, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 867 days.

(21) Appl. No.: 12/988,904

(22) PCT Filed: Apr. 16, 2009

(86) PCT No.: PCT/IB2009/005258
§ 371 (c)(1),
(2), (4) Date: Oct. 21, 2010

(87) PCT Pub. No.: WO2009/130555
PCT Pub. Date: Oct. 29, 2009

(65) Prior Publication Data
US 2011/0036325 A1 Feb. 17, 2011

(30) Foreign Application Priority Data
Apr. 21, 2008 (JP) .................. 2008-110629

(51) Int. Cl.
*F02B 3/04* (2006.01)
*F02B 17/00* (2006.01)

(52) U.S. Cl.
USPC ........... 701/105; 123/295; 123/298; 123/299; 123/305

(58) Field of Classification Search
USPC .................. 701/105; 123/295, 298, 299, 305
See application file for complete search history.

(56) References Cited

U.S. PATENT DOCUMENTS

| 5,271,362 | A  |   | 12/1993 | Kobayashi et al. |         |
|-----------|----|---|---------|------------------|---------|
| 6,067,954 | A  | * | 5/2000  | Kudou et al.     | 123/299 |
| 7,222,602 | B2 | * | 5/2007  | Fukasawa         | 123/299 |
| 7,654,245 | B2 | * | 2/2010  | Kohler et al.    | 123/299 |
| 7,707,988 | B2 | * | 5/2010  | Irisawa          | 123/299 |

(Continued)

FOREIGN PATENT DOCUMENTS

| EP | 0 463 613   | 1/1992  |
|----|-------------|---------|
| JP | 9 287487    | 11/1997 |
| WO | 2007 031157 | 3/2007  |

OTHER PUBLICATIONS

International Search Report issued Sep. 30, 2009 in PCT/IB09/005258 filed Apr. 16, 2009.

(Continued)

*Primary Examiner* — Erick Solis
(74) *Attorney, Agent, or Firm* — Oblon, Spivak, McClelland, Maier & Neustadt, L.L.P.

(57) ABSTRACT

In a direct injection spark ignition internal combustion engine that includes a fuel injection valve, and closes an intake valve after gas in the combustion chamber begins to flow back into an intake passageway after the compression stroke begins. The required fuel injection amount is injected a first fuel injection and a second fuel injection in a single combustion cycle, and the first fuel injection is performed while the intake valve is open during the compression stroke, and the second fuel injection is performed after the intake valve closes. The timing of the first fuel injection is set such that the injected fuel is deflected upwards in the top of the combustion chamber by the gas flowing toward the intake valve.

10 Claims, 3 Drawing Sheets

(56) References Cited

U.S. PATENT DOCUMENTS

| | | | |
|---|---|---|---|
| 2004/0244766 A1* | 12/2004 | Fujieda et al. | 123/299 |
| 2005/0000485 A1* | 1/2005 | Kuo et al. | 123/299 |
| 2005/0161018 A1* | 7/2005 | Tomita | 123/299 |
| 2006/0005804 A1 | 1/2006 | Kuo et al. | |
| 2006/0278196 A1 | 12/2006 | Beer et al. | |
| 2007/0256648 A1* | 11/2007 | Sun et al. | 123/1 A |
| 2008/0041334 A1* | 2/2008 | Brehob | 123/299 |
| 2008/0228378 A1 | 9/2008 | Kohler et al. | |

OTHER PUBLICATIONS

U.S. Appl. No. 12/445,663, filed Apr. 15, 2009, Ashizawa.

* cited by examiner

DIRECT INJECTION SPARK IGNITION INTERNAL COMBUSTION ENGINE, AND FUEL INJECTION CONTROL METHOD THEREFOR

BACKGROUND OF THE INVENTION

1. Field of the Invention

The invention relates to a direct injection spark ignition internal combustion engine, and a fuel injection control method for the same.

2. Description of the Related Art

In conventional direct injection spark ignition internal combustion engines equipped with fuel injection valves, which inject fuel into the combustion chambers, and that perform the homogeneous combustion, the intake valves may be closed after the gas in the combustion chamber begins to flow backward into the intake passageway via the intake valve after the start of the compression stroke, and inject fuel after the intake valve closes (see Japanese Patent Application Publication No. 9-287487 (JP-A-9-287487)). According to this internal combustion engine, because the intake valve of each combustion chamber is closed after the gas in the combustion chamber begins to flow back into the intake passageway via the intake valve after the start of the compression stroke, pumping loss and fuel consumption are reduced. Furthermore, because fuel is injected after the intake valve is closed, the temperature and the pressure at and near top dead center can be made higher than if fuel is injected when the intake valve is open, so that a strong turbulence will advantageously occur, and therefore will improve the combustion rate.

However, in this internal combustion engine, because the time from fuel injection to ignition is short, uniform mixture in the combustion chamber, which is optimum to the homogeneous combustion, cannot be obtained, thus giving rise to a problem of increase of unburned fuel loss, such as increase of unburned fuel, and the like.

SUMMARY OF THE INVENTION

Accordingly, the invention provides a new method of forming air-fuel mixture in a direct injection spark ignition internal combustion engine that closes the intake valve after the gas in the combustion chamber begins to flow back into the intake passageway via the intake valve subsequently to the start of the compression stroke. Specifically, the invention provides a direct injection spark ignition internal combustion engine that forms optimum mixture according to the engine operation state so as to reduce the unburned fuel loss, and also provides a fuel injection control method for the internal combustion engine.

A first aspect of the invention is a direct injection spark ignition internal combustion engine including: a fuel injection valve that injects fuel into a combustion chamber; an intake valve control portion keeps an intake valve open when a compression stroke is started and closes the intake valve after gas in the combustion chamber begins to flow back into an intake passageway through the intake valve during the compression stroke; a fuel injection control portion apportions a required fuel injection amount between a first fuel injection event and a second fuel injection event during a single combustion cycle, and that executes the first fuel injection event when the intake valve is open during the compression stroke, and executes the second fuel injection event after the intake valve closes during the compression stroke, wherein the fuel injection control portion sets a first fuel injection timing such that the fuel injected by the first fuel injection event is deflected upwards in the combustion chamber by gas flow moving toward the intake valve.

In the first aspect of the invention, the fuel injected by the first fuel injection is deflected upwards in the combustion chamber by a gas flow moving from the combustion chamber toward the intake valve, whereas the fuel injected by the second fuel injection is not deflected. Therefore, there is provided a new method of formation of mixture in which the amounts of fuel injected by the two separate injection operations respectively form flows in different directions, so that an air-fuel mixture in the combustion chamber is formed.

In the first aspect, the internal combustion engine may be able to operate in a homogeneous combustion mode in which a fuel-air mixture of having a uniform air-fuel ratio is formed in the combustion chamber, and when the internal combustion engine operates in the homogeneous combustion mode, the fuel injection control portion adjusts the proportion of the required fuel injection amount between the first fuel injection and the second fuel injection by increasing that is injected in the first fuel injection by an amount of fuel that needs to be injected in accordance with an increase in engine load. Herein, "during the homogeneous combustion mode" refers to, for example, the time when the engine load or the engine speed exceeds a predetermined value.

In the foregoing construction, if the engine load increases, the required fuel injection amount is increased. In order to increase the required fuel injection amount, it is necessary to lengthen the injection time. However, if the injection time is lengthened, the penetration force (penetration) also increases. In this case, if the proportion of the amount of fuel that is injected in the second fuel injection is made equal to or larger than the proportion of the amount of fuel that is injected in the first fuel injection, most of the injected fuel gathers in the lower portion of the combustion chamber. Therefore, the proportion of the required fuel injection amount between the first fuel injection and the second fuel injection is adjusted by increasing that is injected in the first fuel injection by an amount of fuel that needs to be injected in accordance with increase in the engine load. Therefore, the absolute amount of fuel that is deflected toward the top portion of the combustion chamber is increased. Therefore, good balance of the distribution between the amounts of fuel injected by the two separate injections can be sought, and a mixture suitable for the homogeneous combustion can be formed by flows of fuel in different directions. If a mixture appropriate for combustion is formed, the combustion rate improves, and it becomes possible to reduce the unburned fuel loss.

In the first aspect, the internal combustion engine may be able to operate in a homogeneous combustion mode in which a fuel-air mixture of having a uniform air-fuel ratio is formed in the combustion chamber, and when the internal combustion engine operates in the homogeneous combustion mode, the fuel injection control portion may adjusts the proportion of the required fuel injection amount between the first fuel injection and the second fuel injection by decreasing that is injected in the first fuel injection by an amount of fuel that needs to be injected in accordance with an increase in engine speed.

In this construction, when the engine speed increases, the gas flow from the combustion chamber toward the intake valve becomes strong, so that the fuel injected by the first fuel injection is more readily deflected. Therefore, the proportion of the required fuel injection amount between the first fuel injection and the second fuel injection can be adjusted by decreasing that is injected in the first fuel injection by an amount of fuel that needs to be injected in accordance with an increase in engine speed. As a result of this, the amount of fuel that is deflected toward the top portion of the combustion chamber is decreased. Therefore, good balance of the distribution between the amounts of fuel injected by the two separate injections can be sought, and a mixture suitable for the homogeneous combustion can be formed by flows of fuel in different directions. If a mixture appropriate for combustion is formed, the combustion rate improves, and it becomes possible to reduce the unburned fuel loss.

In the first aspect, the internal combustion engine may be able to switch between operation in a homogeneous combustion mode, in which an air-fuel mixture of having a uniform air-fuel ratio is formed in the combustion chamber, and a weakly stratified combustion mode, in which the air-fuel ratio of the air-fuel mixture near an ignition plug is richer than the air-fuel ratio of the air-fuel mixture in the rest of the combustion chamber. The air-fuel ratio of the air-fuel mixture in the rest of the combustion chamber, in the absence of the richer air-fuel mixture near the ignition plug, is insufficient to allow ignition by the ignition plug. The fuel injection control portion may set the proportion of the amount of fuel that is injected by the second fuel injection higher during the weakly stratified combustion mode than during the homogeneous combustion mode. Herein, "during the weakly stratified combustion mode" refers to, for example, the time when the engine load becomes a light engine load that is less than or equal to a predetermined engine load and that is likely to cause the combustion to be unstable, or the like.

In this construction, in order to carry out the weakly stratified combustion during the state of light engine load in which the combustion is likely to become unstable, the fuel injected by the first fuel injection is firstly diffused by the gas flow moving from the combustion chamber toward the intake valve, so that a lean mixture is formed in the combustion chamber. Next, the fuel injected by the second fuel injection is guided by utilizing the gas flow in the combustion chamber, so as to form a mixture in the vicinity of the ignition plug. At that time, the fuel injection control portion sets the proportion of the amount of fuel that is injected by the second fuel injection higher during the weakly stratified combustion mode than during the homogeneous combustion mode. As a result of this, a mixture of increased fuel concentration is formed in the vicinity of the ignition plug, whereby a mixture suitable for the weakly stratified combustion in the combustion chamber as a whole is formed. Therefore, stable combustion can be obtained, and it becomes possible to reduce the unburned fuel loss.

In the first aspect, an angle formed between an injection center axis of a fuel injection from the fuel injection valve and a plane perpendicular to a center axis of the piston may be greater than or equal to 45 degrees.

According to the first aspect, the foregoing various constructions achieves a common advantage of being able to provide a new method of mixture formation. Furthermore, since the unburned fuel loss is reduced, an advantage of being able to form an optimum mixture according to the engine operation state can be achieved.

A second aspect of the invention is a fuel injection control method for a direct injection spark ignition internal combustion engine. The internal combustion engine includes a fuel injection valve. The control method including: keeping an intake valve open when a compression stroke starts; closing the intake valve after gas in the combustion chamber begins to flow back into an intake passageway via the intake valve; apportioning a required fuel injection amount between a first fuel injection event and a second fuel injection event during a single combustion cycle; executing the first fuel injection event when the intake valve is open at the start of the compression stroke; executing the second fuel injection event after the intake valve has closed during the compression stroke, and setting a first fuel injection timing so that the fuel injected by the first fuel injection event is deflected upwards in the combustion chamber by gas flow toward the intake valve.

A third aspect of the invention is a direct injection spark ignition internal combustion engine including: a fuel injection valve that injects fuel into a combustion chamber; an intake valve control portion keeps an intake valve open when a compression stroke is started and closes the intake valve after gas in the combustion chamber begins to flow back into an intake passageway through the intake valve during the compression stroke; a fuel injection control portion apportions a required fuel injection amount between a plurality of fuel injection events during a single combustion cycle, and that executes an initial fuel injection event when the intake valve is open during the compression stroke, and executes a subsequent fuel injection event after the intake valve closes during the compression stroke, and sets a first fuel injection timing such that the fuel injected by the initial fuel injection event is deflected upwards in the combustion chamber by gas flow moving toward the intake valve.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
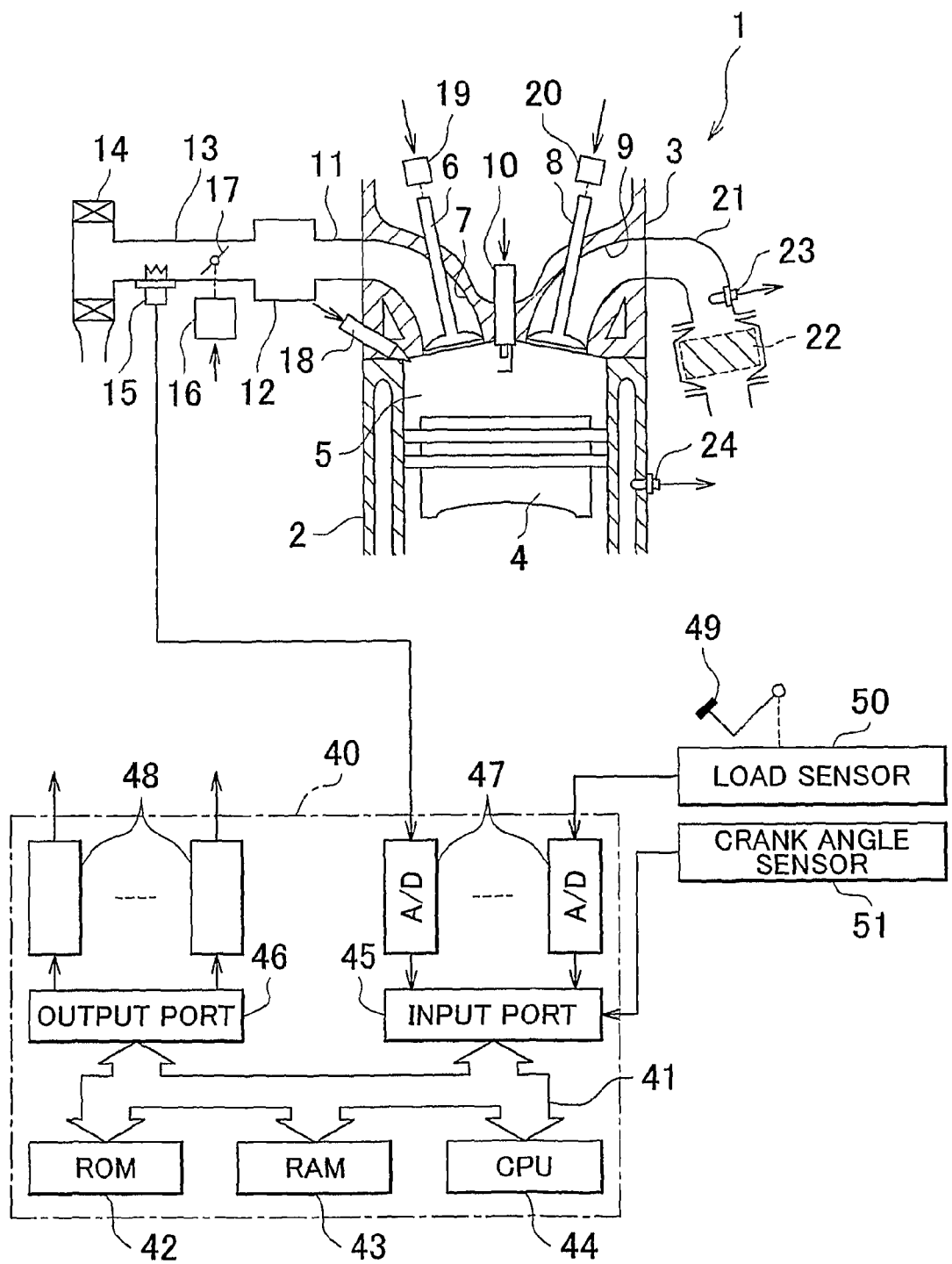
FIG. 1 is a schematic longitudinal sectional view of a direct injection spark ignition internal combustion engine according to an embodiment of the invention.

A direct injection spark ignition internal combustion engine according to an embodiment of the invention will be described with reference to FIG. 1. FIG. 1 shows an engine body 1, a cylinder block 2, a cylinder head 3, a piston 4, a combustion chamber 5, an intake valve 6, an intake passageway 7, an exhaust valve 8, an exhaust passageway 9, and an ignition plug 10. The engine body 1, for example, has four cylinders (not shown), but in this embodiment, following description will be given mainly in conjunction with only one of the cylinders that is shown. The intake passageway 7 is linked, via an intake branch pipe 11, to a surge tank 12. The surge tank 12 is linked to an air cleaner 14 via an intake duct 13. An air flow meter 15, used to detect the amount of intake air flow, and a throttle valve 17, which is driven by a stepping motor 16, are disposed in the intake duct 13. In addition, an electrically controlled fuel injection valve 18 that injects fuel into the combustion chamber 5 is disposed in the combustion chamber 5.

Furthermore, the intake valve 6 and the exhaust valve 8 are provided with a variable valve mechanism 19, 20, respectively. The variable valve mechanism 19, 20 alter the opening movements of the valves. It is to be noted herein that the opening movements of each valve is determined by, for example, one or more of the amount of valve lift, the valve duration and the valve opening start-time, but will not be described in detail herein because any variable valve mechanism may be used in conjunction with the embodiment.

The exhaust passageway 9 is linked, via an exhaust branch pipe 21, to a small-capacity three-way catalyst 22. An air-fuel ratio sensor 23 that detects the air-fuel ratio is attached to the exhaust passageway 9 upstream of the three-way catalyst 22. A coolant temperature sensor 24 for detecting the engine coolant temperature is attached to the engine body 1.

An electronic control unit (ECU) 40 is made up of a digital computer, and includes a read-only memory (ROM) 42, a random access memory (RAM) 43, a microprocessor (CPU) 44, an input port 45, and an output port 46 that are connected with each other by a bi-directional bus 41. A load sensor 50 for detecting the amount of depression of an accelerator pedal 49 is connected to the accelerator pedal 49. It is to be noted herein that the amount of depression of the accelerator pedal 49 represents the requested load.

Output signals of the air flow meter 15, the air-fuel ratio sensor 23, the coolant temperature sensor 24 and the load sensor 50 are input to the input port 45 via corresponding A/D converters 47. A crank angle sensor 51 that generates an output pulse each time a crankshaft rotates through, for example, 30°, is also connected to the input port 45. The CPU 44 calculates the engine speed based on the output pulses of the crank angle sensor 51.

The output port 46 is connected to the ignition plug 10, the stepping motor 16, the fuel injection valve 18, and the variable valve mechanisms 19, 20 via corresponding drive circuits 48. These devices and the like are controlled on the basis of signals from the electronic control unit 40.

The three-way catalyst 22 has an oxygen storage capability. That is, the catalyst stores oxygen from exhaust gas when the air-fuel ratio of the exhaust gas flowing into the three-way catalyst 22 is lean. When the air-fuel ratio of the exhaust gas flowing into the three-way catalyst 22 is rich, the catalyst releases the stored oxygen, whereby HC and CO contained in the exhaust gas are oxidized and removed.

The direct injection spark ignition internal combustion engine according to this embodiment closes the intake valve 6 after the gas in the combustion chamber 5 begins to flow back into the intake passageway 7 via the intake valve 6 subsequently to the start of the compression stroke. Therefore, in the direct injection spark ignition internal combustion engine according to the embodiment pumping losses and fuel consumption are reduced. In addition, this internal combustion engine is able to switch the operation between a homogeneous combustion mode in which a uniform air-fuel mixture is formed in the combustion chamber 5, and a weakly stratified combustion mode in which a mixture is formed in the vicinity of the ignition plug 10, and in which the rest of the combustion chamber is filled with a lean mixture that otherwise could not be ignited merely by the ignition plug 10.

Furthermore, the direct injection spark ignition internal combustion engine according to the embodiment of the invention apportions a required fuel injection amount between a first fuel injection and a second fuel injection during a single combustion cycle. Specifically, the internal combustion engine executes the first fuel injection when the intake valve is open during the compression stroke, and executes the second fuel injection after the intake valve closes during the compression stroke.

Figure 2:
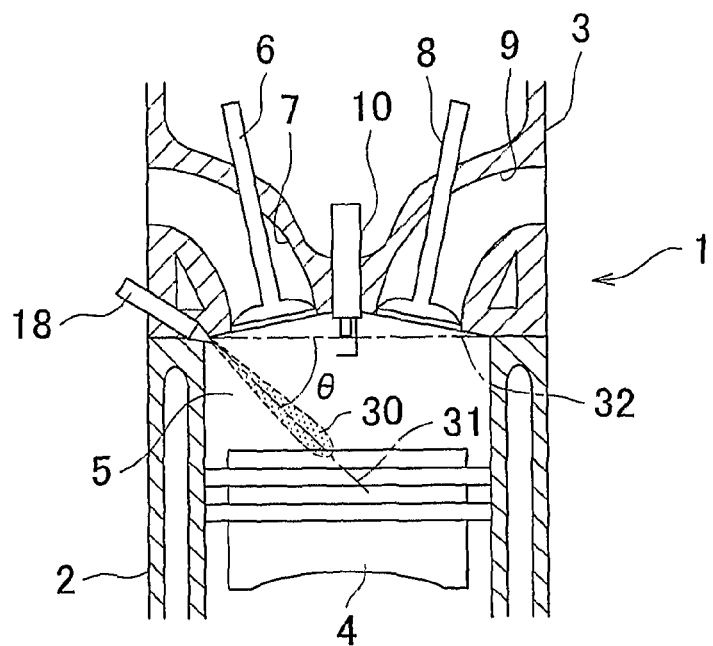
FIG. 2 is a schematic longitudinal sectional view of the direct injection spark ignition internal combustion engine, showing the fuel injection during the compression stroke in which an intake valve is closed.

First, the second fuel injection will be described with reference to FIG. 2. FIG. 2 is a schematic longitudinal sectional view of the direct injection spark ignition internal combustion engine, showing the fuel injection during the compression stroke in which the intake valve 6 is closed. The second fuel injection is not affected by the flow of gas in the combustion chamber 5 as described below, and therefore the injected fuel does not deflect, but moves straight by penetration force (penetration) at the time of injection. The angle formed between an injection center axis 31 of a fuel spray 30 injected from the fuel injection valve 18 and a plane 32 perpendicular to a center axis of the piston 4 is termed the angle θ.

Figure 3:
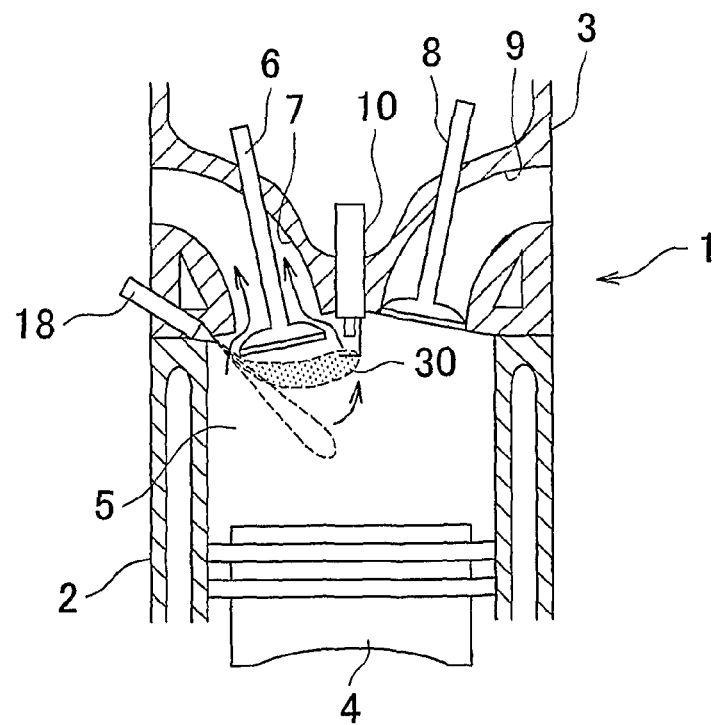
FIG. 3 is a schematic longitudinal sectional view of the direct injection spark ignition internal combustion engine, showing the fuel injection when the intake valve is open.

Next, the first fuel injection will be described with reference to FIG. 3. FIG. 3 is a schematic longitudinal sectional view of the direct injection spark ignition internal combustion engine, showing the fuel injection when the intake valve 6 is open during the compression stroke. In the first fuel injection, the injected fuel is deflected toward the top of the combustion chamber 5 (upwards in the combustion chamber 5) by the gas flow moving from combustion chamber 5 toward the intake valve 6. That is, after the compression stroke starts, the piston 4 rises from the compression bottom dead center, and the gas in the combustion chamber 5 begins to flow back into the intake passageway 7 via the intake valve 6. Therefore, during the first fuel injection, the gas in the combustion chamber 5 flows toward the intake valve 6 or the intake passageway 7, so that the gas flow directs the injected fuel toward the top portion of the combustion chamber, as illustrated by the fuel spray 30 in FIG. 3.

The degree of deflection of the fuel injected during the first fuel injection may be adjusted by the amount of lift of the intake valve 6 that is, the fuel injection timing, the fuel injection speed, or the fuel injection amount. Therefore, according to the embodiment of the invention, by utilizing the backflow of gas in the combustion chamber 5 and adjusting the fuel injection timing or the like, it becomes possible to form a plurality of fuel flows in different directions from one fuel injection valve.

In the embodiment, a new method of formation of air-fuel mixture utilizing the first and second fuel injections is realized. That is, the proportions of the amount of fuel injected during the first fuel injection and the amount of fuel injected during the second fuel injection to the total amount of fuel that is injected may changed to form an optimum mixture in accordance with the engine operation state.

Figure 4:
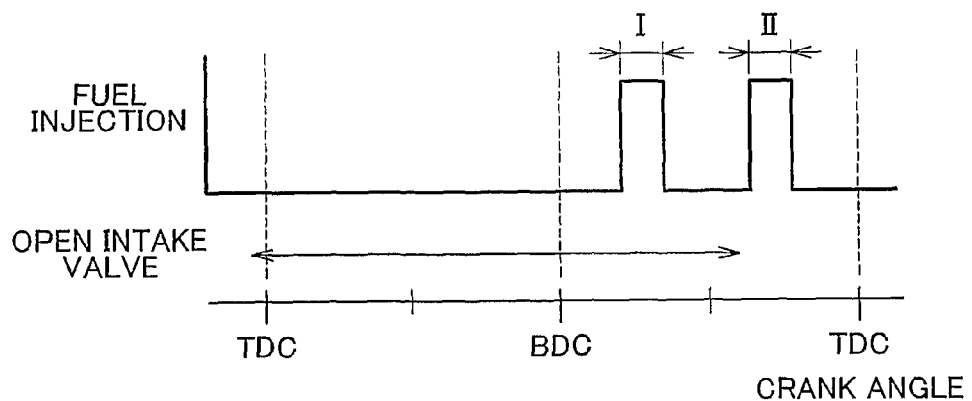
FIG. 4 is a diagram showing a relation between the open valve period of the intake valve and the fuel injection timing according to a first embodiment of the invention.

FIG. 4 is a diagram showing the relation between the duration of the intake valve 6 and the fuel injection timing according to a first embodiment of the invention. In the diagram, the horizontal axis represents the crank angle in a range from the intake top dead center (the left-side TDC) to the compression top dead center (the right-side TDC). The valve closure timing of the intake valve 6 is set to a timing subsequent to the start of the compression stroke, that is, a timing after the piston 4 rises from the compression bottom dead center (BDC) and the gas in the combustion chamber 5 begins to flow back into the intake passageway 7 via the intake valve 6, as described above.

In FIG. 4, "I" represents the first fuel injection timing (fuel injection period), and "II" represents the second fuel injection timing (fuel injection period). In the first embodiment shown in FIG. 4, the amount of fuel injected by the first fuel injection and the amount of fuel injected by the second fuel injection are equal. If the first fuel injection timing I is too early, most of the injected fuel flows out into the intake passageway 7 together with the gas backflow into the intake passageway 7. Conversely, if the first fuel injection timing I is too late, the injected fuel is not sufficiently deflected. Furthermore, if the second fuel injection timing II is too late, a sufficient formation of mixture in the combustion chamber 5 cannot be obtained at the time of ignition. Therefore, it is preferable that the second fuel injection timing II be immediately after the intake valve closes.

Therefore, by adjusting the first fuel injection timing I, it is possible to adjust the degree of deflection of the fuel injected by the first fuel injection. Thus, a new method of mixture formation in which a mixture is formed in the combustion chamber 5 by flows of fuel in different directions made up of the deflected flow of fuel injected by the first fuel injection, and the fuel injected at the angle θ by the second fuel injection is provided.

Figure 5:
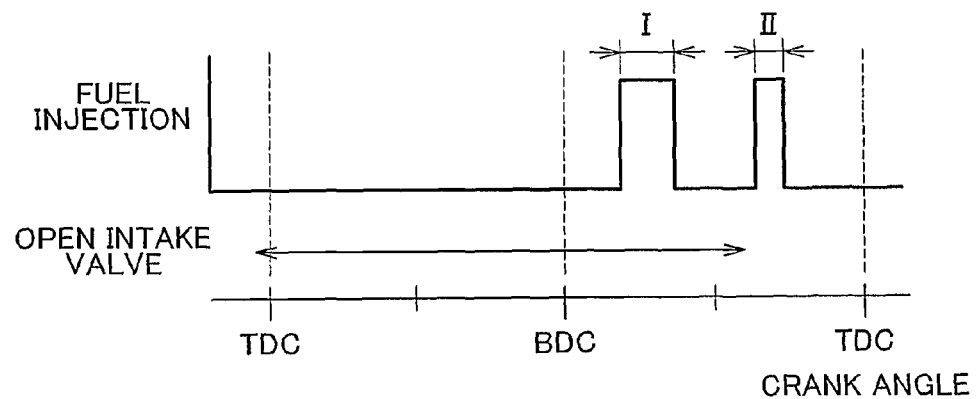
FIG. 5 is a diagram showing a relation between the open valve period of the intake valve and the fuel injection timing according to a second embodiment of the invention.
Figure 6:
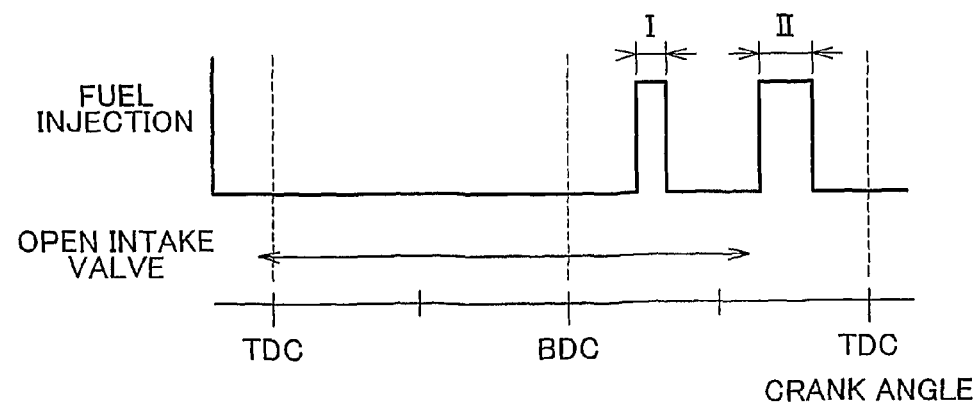
FIG. 6 is a diagram showing a relation between the open valve period of the intake valve and the fuel injection timing according to a third embodiment of the invention.

In FIGS. 5 and 6, which illustrate second and third embodiments as well as in the foregoing first embodiment, the lengths of each of the first fuel injection timing I and the second fuel injection timing II represents the interval during which fuel is injected, and correlates with the amount of fuel.

FIG. 5 is a diagram showing the relation between the duration of the intake valve 6 and the fuel injection timing according to the second embodiment of the invention. In the second embodiment, the fuel injection timings during an engine operation state in which the homogeneous combustion is performed, that is, in which the engine load is higher than in the engine operation state assumed in the first embodiment, are shown.

When the engine load increases, the amount of fuel that needs to be injected increases. In order to increase the amount of fuel that needs to be injected, it is necessary to lengthen the injection time. However, if the injection time is lengthened, the penetration force accordingly increases. In this case, if the proportion of the amount of fuel injected by the second fuel injection is made equal to or larger than the proportion of the amount of fuel injected by the first fuel injection, most of the injected fuel gathers in the lower portion of the combustion chamber 5. Therefore, the proportion of the total amount of fuel that is injected in the first fuel injection is increased with increasing engine load. Therefore, the amount of fuel that is deflected toward the top portion of the combustion chamber 5 is increased. That is, in FIG. 5, the length of the first injection timing I is longer than the length of the second injection timing II. Therefore, a good balance of the distribution between the amounts of fuel injected by the two separate injections may be achieved, and a mixture suitable for homogeneous combustion may be formed.

FIG. 6 is a diagram showing the relation between the duration of the intake valve 6 and the fuel injection timing according to the third embodiment of the invention. In the third embodiment, the fuel injection timings during an engine operation state in which the homogeneous combustion is performed, that is, in which the engine speed is higher than in the engine operation state assumed in the first embodiment, are shown.

That is, with increases in the engine speed, the gas flow from the combustion chamber 5 toward the intake valve 6 becomes strong, so that the fuel injected by the first fuel injection is more readily deflected. Therefore, the proportion of the total amount of fuel that is injected by the first fuel injection to the combined amount of fuel that needs to be injected is lessened according to increases in the engine speed. Therefore, the amount of fuel that is deflected toward the top portion of the combustion chamber 5 is decreased. That is, in FIG. 6, the length of the first injection timing I is shorter than the length of the second injection timing II. Therefore, a good balance of the distribution between the amounts of fuel injected by the two separate injections may be achieved, and a mixture suitable for the homogeneous combustion can be formed by flows of fuel in different directions.

A fourth embodiment of the invention concerns the conduction of a weakly stratified combustion when the engine is under a light load and combustion is likely to become unstable, by utilizing separate first and second fuel injections. In order to carry out weakly stratified combustion, the fuel injected by the first fuel injection is firstly diffused by the gas flow moving from the combustion chamber 5 toward the intake valve 6, so that a lean mixture is formed in the combustion chamber 5. Next, the fuel injected during the second fuel injection is guided by utilizing the gas flow in the combustion chamber 5, to form a mixture in the vicinity of the ignition plug 10. At that time, by causing the proportion of the amount of fuel injected by the second fuel injection to the combined amount of fuel that needs to be injected to be larger than in the homogeneous combustion mode, a mixture of increased fuel concentration is formed in the vicinity of the ignition plug 10, whereby a mixture suitable for the weakly stratified combustion is formed. Therefore, stable combustion can be obtained, and it becomes possible to reduce the unburned fuel loss.

Incidentally, in order to certainly direct the fuel injected by the second fuel injection toward the vicinity of the ignition plug 10, a cavity may be formed on a top surface of the piston 4.

From the above description, the formation of an optimum mixture according to the engine operation state may be realized. In addition, the optimum proportions of the amount of fuel injected by the first and second fuel injections, the timing of the first injection, etc., in the foregoing embodiments may be determined empirically or through calculation.

Ideally, the angle θ be greater than or equal to 45 degrees in order to form optimum mixture in the foregoing embodiments.

The invention claimed is:

1. A direct injection spark ignition internal combustion engine comprising:
    a fuel injection valve that injects fuel into a combustion chamber;
    an intake valve control portion keeps an intake valve open when a compression stroke is started and closes the intake valve after gas in the combustion chamber begins to flow back into an intake passageway through the intake valve during the compression stroke; and
    a fuel injection control portion apportions a required fuel injection amount between a first fuel injection and a second fuel injection during a single combustion cycle, and that executes the first fuel injection when the intake valve is open during the compression stroke, and executes the second fuel injection after the intake valve closes during the compression stroke, wherein the fuel injection control portion sets a first fuel injection timing such that the fuel injected by the first fuel injection is deflected upwards in the combustion chamber by gas flow moving toward the intake valve.

2. The direct injection spark ignition internal combustion engine according to claim 1, wherein the internal combustion engine is able to operate in a homogeneous combustion mode, in which a fuel-air mixture of having a uniform air-fuel ratio is formed in the combustion chamber, and when the internal combustion engine operates in the homogeneous combustion mode, the fuel injection control portion adjusts the proportion of the required fuel injection amount between the first fuel injection and the second fuel injection by increasing that is injected in the first fuel injection by an amount of fuel that needs to be injected in accordance with an increase in engine load.

3. The direct injection spark ignition internal combustion engine according to claim 1, wherein the internal combustion engine is able to operate in a homogeneous combustion mode, in which a fuel-air mixture of having a uniform air-fuel ratio is formed in the combustion chamber, and when the internal combustion engine operates in the homogeneous combustion mode, the fuel injection control portion adjusts the proportion of the required fuel injection amount between the first fuel injection and the second fuel injection by decreasing that is injected in the first fuel injection by an amount of fuel that needs to be injected in accordance with an increase in engine speed.

4. The direct injection spark ignition internal combustion engine according to claim 1, wherein the internal combustion engine switches between operation in a homogeneous combustion mode, in which a fuel-air mixture of having a uniform air-fuel ratio is formed in the combustion chamber, and a weakly stratified combustion mode, in which the air-fuel ratio of the air-fuel mixture near an ignition plug is richer than the air-fuel ratio of the air-fuel mixture in the rest of the combustion chamber, wherein the air-fuel ratio of the air-fuel mixture in the rest of the combustion chamber, in the absence of the richer air-fuel mixture near the ignition plug, is insufficient to allow ignition by the ignition plug, and the fuel injection control portion sets the proportion of the amount of fuel that is injected by the second fuel injection higher during the weakly stratified combustion mode than during the homogeneous combustion mode.

5. The direct injection spark ignition internal combustion engine according to claim 1, wherein an angle formed between an injection center axis of a fuel injection from the fuel injection valve and a plane perpendicular to a center axis of a piston is greater than or equal to 45 degrees.

6. A fuel injection control method for a direct injection spark ignition internal combustion engine, wherein the internal combustion engine includes a fuel injection valve, the control method comprising:
keeping an intake valve open when a compression stroke starts;
closing the intake valve after gas in a combustion chamber begins to flow back into an intake passageway via the intake valve;
apportioning a required fuel injection amount between a first fuel injection and a second fuel injection during a single combustion cycle;
executing the first fuel injection when the intake valve is open at the start of the compression stroke;
executing the second fuel injection after the intake valve has closed during the compression stroke; and
setting a first fuel injection timing so that the fuel injected by the first fuel injection is deflected upwards in the combustion chamber by gas flow toward the intake valve.

7. The control method according to claim 6, wherein the internal combustion engine is able to operate in a homogeneous combustion mode, in which a fuel-air mixture of having a uniform air-fuel ratio is formed in the combustion chamber, and when the internal combustion engine operates in the homogeneous combustion mode the control method further comprises:
adjusting the proportion of the required fuel injection amount between the first fuel injection and the second fuel injection by increasing that is injected in the first fuel injection by an amount of fuel that needs to be injected in accordance with an increase in engine load.

8. The control method according to claim 6, wherein the internal combustion engine is able to operate in a homogeneous combustion mode, in which a fuel-air mixture of having a uniform air-fuel ratio is formed in the combustion chamber, and when the internal combustion engine operates in the homogeneous combustion mode the control method further comprises:
adjusting the proportion of the required fuel injection amount between the first fuel injection and the second fuel injection by decreasing that is injected in the first fuel injection by an amount of fuel that needs to be injected in accordance with an increase in engine speed.

9. The control method according to claim 6, wherein the internal combustion engine switches between operation in a homogeneous combustion mode, in which a fuel-air mixture of having a uniform air-fuel ratio is formed in the combustion chamber, and a weakly stratified combustion mode, in which the air-fuel ratio of the air-fuel mixture near an ignition plug is richer than the air-fuel ratio of the air-fuel mixture in the rest of the combustion chamber, wherein the air-fuel ratio of the air-fuel mixture in the rest of the combustion chamber, in the absence of the richer air-fuel mixture near the ignition plug, is insufficient to allow ignition by the ignition plug, and the control method further comprises:
setting the proportion of the amount of fuel that is injected by the second fuel injection higher during the weakly stratified combustion mode than during the homogeneous combustion mode.

10. A direct injection spark ignition internal combustion engine comprising:
a fuel injection valve that injects fuel into a combustion chamber;
an intake valve control portion keeps an intake valve open when a compression stroke is started and closes the intake valve after gas in the combustion chamber begins to flow back into an intake passageway through the intake valve during the compression stroke; and
a fuel injection control portion apportions a required fuel injection amount between a plurality of fuel injection during a single combustion cycle, and that executes an initial fuel injection when the intake valve is open during the compression stroke, and executes a subsequent fuel injection after the intake valve closes during the compression stroke, wherein the fuel injection control portion sets a first fuel injection timing such that the fuel injected by the initial fuel injection is deflected upwards in the combustion chamber by gas flow moving toward the intake valve.

* * * * *